July 5, 1949.  R. E. BENNETT ET AL  2,475,173
STARTER MECHANISM
Filed Aug. 9, 1947
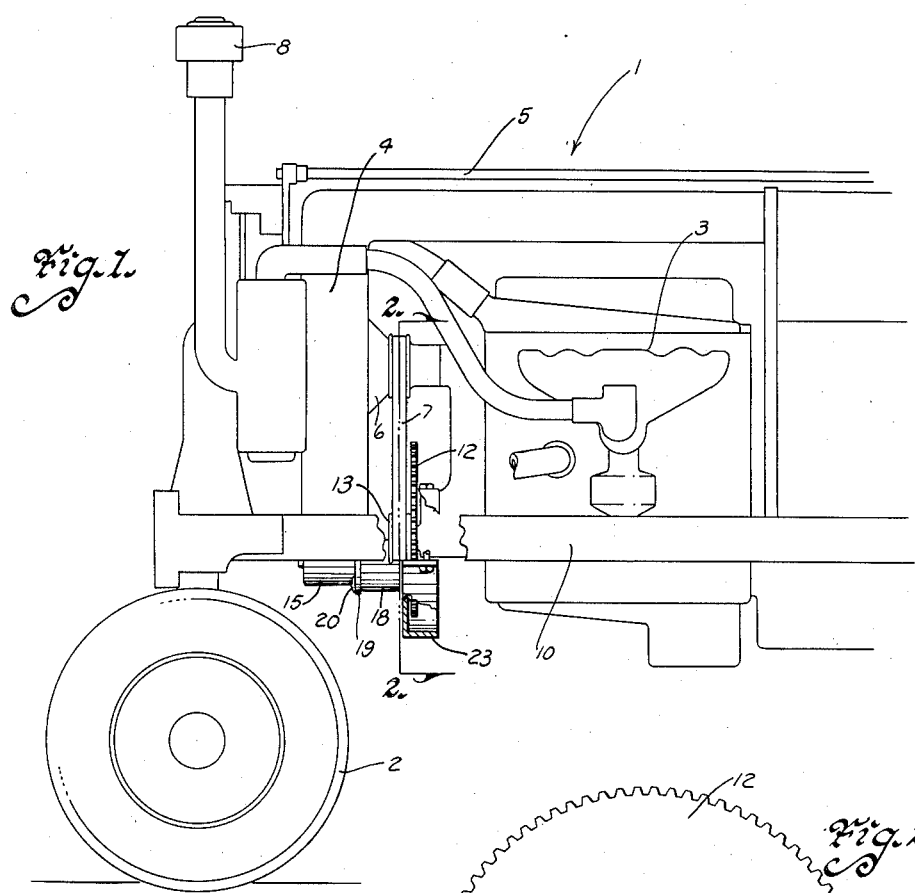
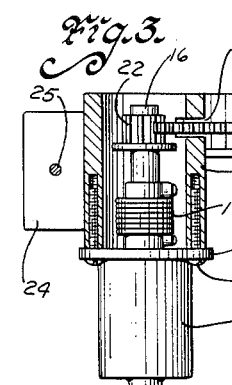
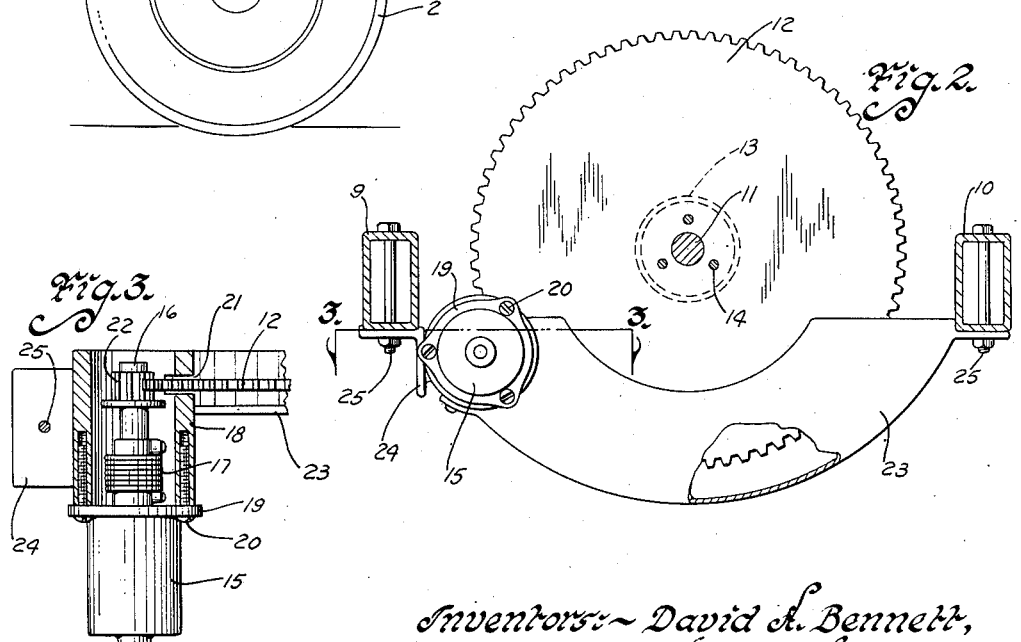
Inventors:— David A. Bennett,
Roy E. Bennett, & Paul G. Bennett
by Harry L. Yunger
Attorney
Witness
Edward P. Seeley Patented July 5, 1949

2,475,173

UNITED STATES PATENT OFFICE 2,475,173

STARTER MECHANISM

Roy E. Bennett, Paul G. Bennett, and David A. Bennett, Lenox, Iowa

Application August 9, 1947, Serial No. 767,756

2 Claims. (Cl. 74—7)

1

This invention relates to a starter mechanism and more particularly to a starter mechanism to be placed on a tractor that was originally sold without a starter mechanism.

There are many tractors still in use that were originally sold without starter mechanisms as original equipment. It is with the problem of equipping such a tractor with a starter mechanism that the present invention is involved.

It is an object of the present invention, among others, to provide a starter mechanism for a tractor that can easily be adapted and mounted on a tractor; a starter mechanism that is simple in construction and operation, easy to operate and economical both in construction and operation; a starter mechanism that is long lasting and durable in operation, requiring less repair and lost time in operation; a starter mechanism that is easy to operate, simple in design and easy of repair in case of breakdown; a starter mechanism requiring no special skill to mount on a tractor; and a starter mechanism that can be supplied at an economical price.

In carrying out the objects of the invention there is provided a starter mechanism for attachment to a tractor having a supporting member on each side of the tractor and a main drive shaft for the tractor. A gear is attached to the main drive shaft of the tractor. A starter motor has a shaft extending from the starter motor and has a gear on the shaft extending from the starter motor. A housing member is attached to the starter motor and extends from the starter motor to cover the shaft extending from the starter motor. The starter motor has a shoulder on one end thereof against which the housing member abuts and bolts pass through the shoulder on the starter motor and are screwed into the wall of the housing member to attach the starter motor and housing member together. There is a slit in the outer circumference of the housing member of sufficient length to form an opening to allow the outer portion of the gear on the main drive shaft to extend through the opening and mesh with the gear on the shaft extending from the starter motor. The starter motor and housing member are supported from the supporting members on each side of the tractor and a shield is attached at one end to a supporting member on the tractor which shield extends under and around the gear on the main drive shaft with the other end of the shield attached to the housing member and a bracket is mounted on the housing member to attach the housing member to the other supporting member on the tractor.

2

With the foregoing and other objects in view, the invention will be more fully described herewith and will be particularly pointed out in the claims appended hereto.

In the drawings, wherein like symbols refer to like or corresponding parts throughout the several views:

Figure 1 is a side elevational view of a tractor with the starter mechanism shown shaded and mounted on the tractor.

Figure 2 is a sectional view taken on the line 2—2 of Figure 1.

Figure 3 is a sectional view taken on the line 3—3 of Figure 3.

A tractor of the type subject to the improvement embodied in our invention is indicated at 1 in Figure 1 which has two large wheels on the back and two small wheels on the front, one of which is shown at 2, so as to make three tracks when the tractor is in motion. The tractor has a power unit or engine 3; a radiator 4, steering column 5, fan 6, fan belt 7 and exhaust discharge 8. The tractor has a pair of side supporting members 9 and 10 forming a framework for supporting the different portions making up the tractor. A main drive shaft 11 (Figure 2) is connected with the engine 3 and transmits power from the engine 3 to the rear wheels of the tractor 1.

A gear 12 is attached to and rotates with the main drive shaft 11. A fan belt pulley 13 is attached to the main drive shaft 11 and has openings drilled through the pulley 13 and gear 12 into which openings bolts 14 are entered in order to attach the pulley 13 and gear 12 together. The main drive shaft 11 can be separated so that the gear 12 can be placed over the main drive shaft 11 and holes drilled in the pulley 13 and gear 12.

A starter motor 15 is a regular electric motor operable from a battery carried by the tractor and set into operation from a push button accessible from the driver's seat. The starter motor 15 has a shaft 16 extending therefrom which is thrown outwardly when the starter motor 15 starts into operation. When the starter motor 15 stops, a spring 17 pulls the shaft 16 rearwardly toward the starter motor 15.

A housing member 18 extends from the starter motor 15 and covers the shaft 16. The starter motor 15 has a flange 19 surrounding one end thereof through which bolts 20 pass and are screwed into the wall portion of the housing member 18 to attach the starter motor 15 and the housing member 18 together. The housing member 18 has a slit 21 forming an opening through which the gear 12 extends to within the housing member 18. The shaft 16 has a gear 22 mounted thereon with which the gear 12 meshes when the starter motor 15 is operating. It can thus be seen that when the starter motor 15 is rotated, shaft 16 with gear 22 attached will be rotated and thrown outwardly so gear 22 meshes with the gear 12. The gear 12 will be rotated, thus rotating main shaft 11 which turns over the motor to start the same.

A shield 23 is connected at one end thereof to the supporting member 10 of the tractor as by bolt 25. The shield covers a portion of the front face of the gear 12 and extends inwardly to protect the underface of the gears as the gear 12 rotates. The other end of the shield 23 is attached to the housing member 18 in any suitable manner such as by bolts, welding etc. A bracket 24 is attached to the housing member 18 and provides the means for attaching the housing member 18 and hence the starter motor 15 and housing member 18 to the other supporting member 9 of the tractor by a bolt 25.

It can thus be seen that a structure is provided that is easily mounted on a tractor already in operation without any change in the structure of the tractor.

It will be understood that the invention has been described for purposes of illustration and explanation and that changes and variations are possible without departing from the scope of the invention; all such modifications and changes are intended to be included in the appended claims.

We claim:

1. In a starter mechanism for attachment to a tractor having a supporting member on each side of the tractor and a main drive shaft for the tractor, a gear for attachment to the main drive shaft of the tractor, a starter motor with a shaft extending beyond the starter motor, a gear on the shaft extending from the starter motor, the improvement comprising a housing member attached to the starter motor to cover the shaft extending from the starter motor, a slit in the outer circumference of the housing member of sufficient length to form an opening in the housing member to allow the outer portion of the gear on the main drive shaft to extend through the opening and mesh with the gear on the shaft extending from the starter motor, a shield for attachment at one end to a supporting member on the tractor extending under and around the gear on the main drive shaft with the other end of the shield attached to the housing member and a bracket on the housing member to attach the housing member to another supporting member on the tractor.

2. In a starter mechanism for attachment to a tractor having a supporting member on each side of the tractor and a main drive shaft for the tractor, a gear for attachment to the main drive shaft of the tractor, a starter motor with a shaft extending beyond the starter motor, a gear on the shaft extending from the starter motor, a shoulder on one end of the starter motor, the improvement comprising a housing member abutting against the shoulder on the starter motor, bolts passing through the shoulder on the starter motor and screwing into the wall of the housing member to attach the starter motor and housing member together, said housing member covering the shaft extending from the starter motor, a slit in the outer circumference of the housing member of sufficient length to form an opening to allow the outer portion of the gear on the main drive shaft to extend through the opening and mesh with the gear on the shaft extending from the starter motor, a shield for attachment at one end to a supporting member on the tractor extending under and around the gear on the main drive shaft with the other end of the shield attached to the housing member and a bracket on the housing member to attach the housing member to another supporting member on the tractor.

ROY E. BENNETT.
PAUL G. BENNETT.
DAVID A. BENNETT.

REFERENCES CITED

The following references are of record in the file of this patent:

UNITED STATES PATENTS

| Number | Name | Date |
|---|---|---|
| 1,124,264 | Bendix | Jan. 12, 1915 |
| 1,173,766 | Bendix | Feb. 29, 1916 |
| 1,244,482 | Durham | Oct. 30, 1917 |
| 1,246,674 | Stevens | Nov. 13, 1917 |
| 1,247,138 | Mylius | Nov. 20, 1917 |
| 1,264,324 | Mitchell | Apr. 30, 1918 |
| 1,330,567 | Wolffsohn | Feb. 10, 1920 |